(12) United States Patent
Tatoh

(10) Patent No.: US 6,464,393 B2
(45) Date of Patent: Oct. 15, 2002

(54) SURFACE TEMPERATURE SENSOR HEAD

(75) Inventor: Nobuyoshi Tatoh, Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 23 days.

(21) Appl. No.: 09/725,502

(22) Filed: Nov. 30, 2000

(65) Prior Publication Data
US 2001/0002918 A1 Jun. 7, 2001

(30) Foreign Application Priority Data
Dec. 3, 1999 (JP) ............................................. 11-344569

(51) Int. Cl.$^7$ ................................................ G01K 7/00
(52) U.S. Cl. ........................................ 374/179; 136/233
(58) Field of Search .................... 374/120, 179; 136/232, 233, 236.1

(56) References Cited

U.S. PATENT DOCUMENTS

| | | | | | |
|---|---|---|---|---|---|
| 2,846,493 A | * | 8/1958 | Lindenblad | ............... | 136/236.1 |
| 2,997,513 A | * | 8/1961 | Rall et al. | ................... | 136/233 |
| 4,795,498 A | * | 1/1989 | Germanton et al. | ........ | 374/179 |
| 4,848,922 A | * | 7/1989 | Chow | ......................... | 374/31 |
| 5,876,119 A | * | 3/1999 | Ishikawa et al. | ............. | 374/134 |
| 5,999,081 A | * | 12/1999 | Hannigan et al. | ........... | 374/208 |
| 6,311,016 B1 | * | 10/2001 | Yanagawa et al. | .......... | 392/416 |

FOREIGN PATENT DOCUMENTS

| | | | | | |
|---|---|---|---|---|---|
| DE | 4223440 A1 | * | 1/1944 | .................. | 374/120 |
| DE | 4223453 A1 | * | 1/1944 | .................. | 374/120 |
| JP | 52048384 A | * | 4/1977 | .................. | 374/179 |
| JP | 4-191626 | | 7/1992 | | |
| JP | 4-359445 | | 12/1992 | | |
| JP | 05118928 A | * | 5/1993 | .................. | 374/120 |
| JP | 7-74218 | | 3/1995 | | |
| JP | 11-125566 | | 5/1999 | | |

* cited by examiner

Primary Examiner—Diego Gutierrez
Assistant Examiner—Mirellys Jagan
(74) Attorney, Agent, or Firm—McDermott, Will & Emery

(57) ABSTRACT

A surface temperature sensor head including a first layer made of a material of a heat conductivity higher than 100 W/mK, a second layer having a crossing tips of a thermocouple and a brazing material and a third layer made of a material of a heat conductivity higher than 100 W/mK, the brazing material unifying the crossing tips, the first layer and the third layer. The sensor head enables a temperature prober to measure temperatures of an object non-destructively with high spatial resolution.

20 Claims, 7 Drawing Sheets

SURFACE TEMPERATURE SENSOR HEAD

BACKGROUND OF THE INVENTON

1. Field of the Invention

This invention relates to an improvement of a surface temperature sensor head. A laser diode (LD) is one of the most important key devices of optical communication systems.

This invention claims the priority of Japanese Patent Application No.11-344569 (344569/1999) filed Dec. 3, 1999 which is incorporated herein by reference.

Since high density current flows in a tiny LD chip, the current produces large heat in the laser diode. The large heat raises the temperature of the LD chip. The high temperature deteriorates the properties and decreases the reliability of the LD. Further, the large heat changes the oscillation frequency of the LD or shortens the lifetime of the LD. Thermal analysis on the LDs has been energetically carried out for enhancing the property and the efficiency of LDs.

The multiwavelength transmission technology attracts attention. Application of LDs to the light source of the multiwavelength transmission requires more rigorous temperature control of the LDs, because the change of the temperature varies the oscillation frequency of the LDs. The change of the oscillation frequency also varies the performance of wavelength division multiplexers (WDMs) and the sensitivity of photodetecting devices. The temperature of the LD should be controlled for prohibiting the oscillation frequency from changing. Enhancement of the importance of the temperature control requires further progress of thermal analysis technology for measuring the temperature distribution in a tiny LD chip.

General semiconductor devices, for example, LSIs, tend to pursue the higher speed and larger data capacity. However, increasing heat generation prevents the semiconductor devices from accomplishing the higher speed and higher data capacity. A further development of the LSIs requires the progress of the thermal analysis technology.

Inspection and examination of LSIs request the technology which enables the operators to carry out electric measurements and the thermal measurements simultaneously at a high speed.

The present invention aims at answering the requests for improved thermal analysis technology. The present invention proposes a surface temperature sensor head available for the thermal analysis or inspection of the LDs, LSIs or other electronic devices. This invention will serve a sensor head of a non-destructive temperature probe for seeking temperature distribution by measuring temperature. at a plurality of small spots of an object without breaking the object.

2. Description of Related Art

The thermal analysis technology investigates spatial temperature distribution of an object by various means. The measuring of temperature requires temperature sensors. There are various kinds of temperature sensors, for example, thermocouples, thermistors, radiation thermometers and so on. The temperature sensors measure temperature on different bases.

The thermocouple is a sensor which makes use of the voltage thermally induced at the junction which is proportional to the temperature difference between two joints of two different metal wires. Since the thermocouple utilizes thermoelectromotive force, the temperature of an object is measured by fixing a tip (unction of two metals) of the thermocouple tightly to a spot of the object with a paste or silver solder of good thermal conductivity. Since the tip .should be tightly in contact with the object, the paste or solder fixes the tip on a surface of the object. The paste fixation forbids the thermocouple to move the tip. It is difficult for the thermocouple to measure temperature at a plurality of spots on an object because of the difficulty of moving the tip. The modes of measurement are restricted by the fact that the tip should be tightly touched to the object.

Some other sensors make use of the change of electric resistance depending upon temperature. They are a thermistor thermometer and a platinum thermometer resistor. The thermistor should also be fixed to an object by paste or solder for maintaining a tight contact between the sensor and object. The difficulty of moving a sensing part accompanies the thermistors.

A micro-radiation thermometer is a sensor which measures temperature at many points of an object and displays the temperature distribution on an image. Radiation power from a heated object is determined by Rayleigh-Jeans' Law. The peak wavelength of the radiation is proportional to an inverse of the absolute temperature of the object. The whole radiation per a unit area is in proportion to a quadruple of the absolute temperature by Stefan-Boltzmann's Law. The radiation thermometer measures the temperature or temperature distribution on a surface by the wavelength distribution and the total power of infrared radiation from the surface of the object. Unlike the thermocouples or thermistors, the radiation thermometer is a non-contact type sensor. The non-contactness enables the radiation thermometer to measure the temperature of an object from a remote spot. The radiation thermometer can obtain spatial temperature distribution by changing the directions for measuring the radiation on the object.

The purpose of the present invention is to obtain exact temperature distribution on a small device, for example, an LD, an LSI or so. Prior art which aimed at a similar purpose should be described.

① Japanese Patent Laying Open No.4-191626 (191626/'92) "Surface temperature measuring sensor" tried to measure the exact temperature of an object by making use of a sheathed thermocouple and a copper disc. The tip of the sheathed thermocouple is fixed in the copper disc. The sensor measures the temperature of an object by boring a hole on the object and inserting the copper disc having the sheathed thermocouple into the hole.

The object is heat exchangers, steam turbines, reaction furnaces and so on. The reason why the thermocouple is sheathed by an insulator is that the thermocouple must be insulated from the metal objects. The reason why the copper disc is fixed to the tip of the thermocouple is that the temperature of the object can be measured exactly and speedy by maintaining a tight and stable contact with the object. It takes only a short time. for the object to attain thermal equilibrium with the copper disc having a high thermal conductivity and large heat capacitance. The sensor measures the temperature of the copper disc which keeps the thermal equilibrium with the object.

If the tip of the thermocouple is bluntly pushed to the object without the copper disc, unstable air gaps existing between the tip and object suppress heat conduction, inhibit thermal equilibrium and forbid the sensor to measure the exact temperature of the object. The copper disc helps the sensor of ① to shield noise and measure the exact temperature of the object.

In the examination of LSIs, the properties should be tested for the LSIs in a regularly driven and thermally controlled state. LSI examinations often use a "probe-card type" prober having plenty of probing needles which can come into simultaneous contact with all the electrode pads on the object LSI. The examination apparatus measures the properties and characters of the LSIs by bringing all the needles of the probe-card type prober into the counterpart electrode pads of the LSI in the thermally controlled state.

The temperature control requires a couple of a heater and a temperature sensor. In general, a thermocouple is fitted on a susceptor for sustaining a wafer as a substrate for producing LSIs for protecting the wafer from contamination. The LSI testing apparatus measures the properties and characteristics by monitoring the temperature of an object LSI by the thermocouple, maintaining the LSI at a predetermined temperature by the heater, supplying the object LSI with driving currents, source and ground voltages and input signals and monitoring output currents, output voltages and output signals.

② Japanese Patent Laying Open No.4-359445 (359445/'92), "Heat testing probing apparatus", suggested an improvement of the wafer heat testing probe which measures electric properties by maintaining an object wafer at a predetermined temperature, bringing the needles of the probe into contact with the electrodes of the object wafer and examining currents, voltages and signals. Even if the temperature distribution is once exactly built in the object wafer, a contact of the probe needles to the wafer perturbs the once-built temperature distribution. Even a touch of a very thin needle induces extra heat conduction which disturbs the temperature of the wafer.

This improvement contrives to reduce the temperature fluctuation induced by the touch of the probe needles by maintaining the probe at the same temperature as the wafer. For the purpose, this improvement provides the probe with a Peltier device and a temperature sensor. The Peltier device can heat or cool the probe by alternating the directions of current flow. The temperature sensor is a thermocouple. The tip of the thermocouple is buried into the probe for sensing exact temperature of the probe. The reason why the tip is buried into the probe is that exact temperature can be measured by reducing the heat resistance between the tip and the probe.

③ Japanese Patent Laying Open No.7-74218, "Method for testing ICs and probe card for testing", proposed an improvement of a probe card for an IC wafer test. The IC wafer test is a comprehensive testing method which examines the properties and characteristics of individual IC chips with a probe card chip by chip on an object wafer which has not been cut into individual chips yet. Although the purpose is the examination of individual IC chips, the method is called a "IC wafer test" instead of "IC chip test", since the examination is done before the wafer is scribed into separated chips.

The probe card has a lot of probing needles projecting downward from the bottom. The probing needles are used for testing electrical properties of the ICs by touching the electrode pads of the ICs. In addition to the conventional electrical property testing needles, ③ proposed to provide the probing card with thermally testing probing needles for testing the temperature distribution of the object ICs. This improvement prepared four temperature monitoring needles per an IC chip for touching corners of the chip. The temperature monitoring needles enable the probe card to measure the temperature distribution on the surface of the IC chips easily for a short time.

The wafer having many IC chips is heated by a heater furnished in the stage. The temperature is monitored by a thermocouple in the stage. The temperature of the stage is controlled by the heater and the stage-thermocouple. However, the temperature of the wafer is not necessarily equal to the temperature of the stage. Sometimes actual temperatures of the wafer or the ICs deviate from the designation of the stage-thermocouple. ③ suggested to add extra probe needles to the probe card for monitoring temperatures of the ICs. The temperature monitoring needles are also thermocouples.

④ Japanese Patent Laying Open No.11-125566, "Surface temperature measuring sensor and temperature measuring probe", proposed a surface temperature measuring sensor head having a low thermal conductive tube, a thermocouple piercing the tube and a high thermal conductive metal half-sphere holding the tip of the thermocouple. This application also proposed a temperature measuring probe for measuring surface temperature of an object by touching the half-spherical metal of the surface temperature sensor head to the object.

The surface temperature sensor head of ④ is now explained by referring to FIG. 2. In the figure, the sensor head is denoted by numeral 3. A thermocouple 1 pierces through a tube 2 of low thermal conductivity. The tip of the thermocouple 1 is held by a hemispherical metal contacter 19 of high thermal conductivity. The hemispherical contacter 19 has a central hole 20. The tip of the thermocouple 1 is inserted and fixed in the central hole 20. The contacter 19 and the tip are unified. The hemispherical metal contacter 19 is made of a material having thermal conductivity higher than 100 W/mK. The contacter 19 is made of, e.g., copper. The contacter 19 has a hemispherical top and a flat bottom. The flat bottom can be brought into contact to a surface of an object. The flat bottom has a small diameter of 0.5 mm to 1 mm for detecting subtle spatial change of temperature with high resolution. The contacter 19 is a very tiny metal hemisphere.

The tube 2 pushes the hemispherical contacter 19 down via a heat insulator 18. The probe head of ④ consists of the tube 2. the thermocouple 1, the insulator 18 and the hemispherical contacter 19.

The metal hemisphere is attached to the tip of the thermocouple for equalizing the temperature of the tip to the temperature of the object through thermal equilibrium. For the purpose, the hemisphere metal should have thermal conductivity higher than 100 W/mK. High thermal conduction is a requisite for the contacter.

The metallic contacter 19 is brought into contact to the surface of the object temporarily by the pressure from the tube. Unlike prior art ① and ②, ④ does not fix the thermocouple to the object, e.g., with a resin. Without permanent attachment, the function of the metal hemisphere 19 rapidly brings the tip into the thermal equilibrium with the object. Since the tip is not fixed to the object, the surface temperature measuring head (probe) can be freely moved on the surface. Freedom of movement enables the sensor head to measure temperatures at lots of points for seeking temperature distribution on the surface.

The spatial resolution is restricted by the size of the hemisphere metal 19. Enhancement of spatial resolution requests a smaller metal hemisphere contacter 19. Reliability of measurement requires a bigger metal hemisphere for suppressing noise by establishing stable equilibrium. The use of the low thermal conduction tube 2 aims at preventing the header from perturbing the temperature of the object by the heat conduction through the tube to the object.

There are some proposals for seeking spatial temperature distribution on an object. However, drawbacks plague these proposals. Problems are explained about the temperature measuring method except the thermocouples.

The radiation thermometer is an apparatus of catching infrared rays radiated from a sample (object) via a microscope by a CCD (Charge Coupled Device) array and displaying the temperature distribution on a monitoring TV. When the sample is a composition of metal and glass, the components have different radiation rates and infrared light scattered by the metal surface induces external noise. The difference of radiation rates and the induced noise disturb the operation of the radiation thermometer. Carbon should be painted overall on the sample for suppressing the radiation difference and the reflection noise. The carbon coating cannot be eliminated. The way by the radiation thermometer is not a non-destructive measurement for the compounds of metal and glass. This is one weak point.

Another drawback appears in the case of samples having steps on the surface. When the sample is a ceramic packaged IC, a top of an IC is higher than the bottom of the package. The difference of the heights prohibits the microscope from tuning the focus simultaneously both to the IC top and to the package bottom. Defocus of the microscope impairs spatial resolution of the temperature distribution.

The chip thermistor or the platinum temperature measuring resistor (resistor sensors) has other drawbacks. These devices have a chip for sensing temperature and wires connecting with the chip. Owing to the sensing chips, these thermometers' are inapt for measuring temperature at narrow regions.

The sensor chip is fixed to a sample by brazing the chip to an object via a submount with wiring patterns. Because of the brazing, non-destructive measurement is difficult for the chip thermistor or the platinum temperature measuring resistor. There is large fluctuation of the resistance among the sensors. The resistor sensors are inappropriate for simultaneous measurement of a plurality of spots by several chips. The thermistor and the platinum resistor lack sturdiness. Fragility causes inconvenience of maintenance.

The measurement by thermocouples has also problems. The temperature of an object is measured by thermoelectromotive force induced between the different metals by the difference of temperatures. The sensing part is a tip of the joint of two metals. The joint of the thermocouple is usually connected to a sample with a heat conductive paste or braze. The paste or braze stains the sample. Non-destructive measurement is difficult for the thermocouple.

① proposed the attachment of a copper plate to the tip of the thermocouple for improving the heat conductivity between the thermocouple tip and object. However, such a sensor is inapt for measuring temperature at different spots on an object. Besides, another problem should be pointed out for the thermocouple making use of a kind of heat sink, for example, a copper disc.

The thermocouple requires tight contact for maintaining thermal equilibrium between the tip and the sample. Attachment of a large heat sink to the tip is effective for enhancing the tightness of contact. When the heat sink itself is large, the heat sink has a large thermal resistance. The large heat sink hinders the thermocouple in measuring temperature distribution of narrow regions on the sample. Furthermore, the large heat sink deprives the sample of heat, which perturbs the thermal equilibrium. Thus, exact measurement is prohibited by the attachment of the big heat sink.

These drawbacks recommend the employment of a smaller copper plate as a heat sink of a thermocouple. A smaller copper disc (plate) would be preferable for measuring micro-temperature distribution of an object from the standpoint of enhancing the resolution. However, it is difficult to fix a small copper disc to the tip of a thermocouple. Even if a small copper disc could be once fixed to the tip of a thermocouple by some means, the copper heat sink would easily be got off the thermocouple. Otherwise, the tip of the thermocouple would be broken owing to the attached copper disc. These difficulties accompany the Cu-carrying thermocouples.

③ Japanese Patent Laying Open No.7-74218 proposed a temperature prober made by adopting thermocouples as a temperature sensor. Detailed explanation about the tip of the prober is not given. Nobody knows what structure ③ proposed for a tip of the prober.

② Japanese Patent Laying Open No.4-359445 used a thermocouple for controlling the temperature of an object. It would be sufficient to measure only a spot of the object. It is inappropriate for determining temperature distribution which requires temperatures at a plurality of spots.

④ Japanese Patent Laying Open No.11-125566 employed a hemispherical surface temperature sensor head. It is an exquisite sensor. The production of the hemisphere requires difficult processing of boring a microhole in the copper ball and cutting the Cu ball into hemispheres. In particular, it is difficult to finish a tiny copper ball of a diameter of less than 0.8 mm. On the other hand, the copper head is so big that it is difficult to investigate microdistribution of temperature of the object having a complex surface structure. Further, it is difficult to investigate microdistribution on the surface.

SUMMARY OF THE INVENTION

The present invention proposes a surface temperature sensing head having a tip of a thermocouple and two high heat conductive plates sandwiching the tip of the thermocouple and a braze. Namely, the sensing head of the present invention has a three layer structure containing a first high heat conductive plate, a tip and braze layer, and a second high heat conductive plate. The brazing material has the role of joining the tip and the two plates. The plates have high heat conductivity and enough heat capacitance. The good heat conduction and sufficient heat capacitance enable the-plates to arrive at thermal equilibrium with an object rapidly. High heat conduction is required for the plates in order to establish the thermal equilibrium. Poor heat capacitance of the thin tip would bring about only unstable contact with the object, if a naked tip were in contact with the object. The plates allow the tip to reach stable equilibrium with the object through the good heat conduction and heat capacitance. Higher the heat conduction of the plates and the brazing material rises, the better the response is realized and the higher the accuracy of measurement is increased.

Too large heat capacitance is undesirable for the plates. Too big plates should also be prohibited, since the size of the plates restricts spatial resolution of measurement. The high heat conductivity of the plates means here conductivity more than 100 W/mK. Another unit of heat conduction is "cal/cmsec°C.". The two units are coupled by a relation of 1 cal/cmsec°C.=420 W/mK. Materials having heat conductivity higher than 100 W/mK are, for example, copper (Cu), copper alloys, molybdenum (Mo), magnesium (Mg), silver (Ag), aluminum (Al), aluminum alloys, gold (Au) and so on. One material should be selected from the candidates for making the plates.

The sensor head of the present invention resembles the prior art ④. However, ④ is a head made by boring a hole in a metallic hemisphere, piercing a tip of a thermocouple into the hole and fixing the tip in the hole. In stead of the hemisphere and hole, this invention employs one or two thin plates for sandwiching the tip between the two plates. Thin plates can easily be cut and be folded into half. Preparing simple plates is easier than making a hemisphere. The present invention dispenses with the difficult perforation of a narrow hole on the small hemisphere.

FIG. 3 is a horizontally sectioned plan view of a sensing head 3. FIG. 4 is a vertically sectioned view of the same sensing head 3. A first layer is a thin metal disc plate 22. A crossing spot 26 of a tip of a thermocouple 1 is placed upon the first metal disc 22. The crossing spot 26 is a sensing spot generating the thermoelectromotive force. The tip of the thermocouple 1 is tightly fixed to the metal disc plate 22 with a brazing material 25. A second layer 23 consists of the crossing tips 26 and the brazing material,25. A third layer is a metal disc plate 24 pressing the brazing material 25 and the sensing tips 26. The sensing head of the present invention has a three-storied structure. The lower metal plate 22 and the upper metal plate 24 sandwich the thermocouple tips 26 and the brazing 25. The metal plates should be endowed with high thermal conductivity more than 100 mW/K. The brazing material 25 unites together the upper metal plate 24, lower metal plate 22 and thermocouple tips 26. FIG. 4 shows an example having the two separated metal discs 22 and 24 which are easily produced. In short, the sensing head of the present invention includes;

the third layer 24 . . . a metal plate
the second layer 23 . . . a brazing material 25 and a crossing spot 26 of thermocouple 1
the first layer 22 . . . a metal plate, from top to bottom.

In comparison with the prior art of FIG. 2, the sensor head of the present invention dispenses with boring of a microhole 20. An advantage of this invention is the omission of the difficult boring process. Another advantage is the elimination of the difficult finishing of the small hemisphere.

The sensor head has a simple structure of piling plates for sandwiching a tip of a thermocouple which facilitates production. The production of the head dispenses with the difficult step of finishing a metal block into a hemisphere or boring a microhole through the block. An assembly of the sensor heads of the present invention can measure temperatures at a plurality of spots of a diameter of less than 0.8 mm on an object simultaneously with high accuracy. An additional contrivance allows the present invention to measure temperature at a small spot of a diameter of less than 0.3 mm. The sensor heads enable the LSI testers to examine the electronic or optical properties of LDs or LSIs with high accuracy in a short time. This invention is effective in producing a heat analysis apparatus of high resolution and high precision. The handling of the temperature prober having the sensor head is as simple as the conventional microprober instead of far higher spatial resolution than the prior microprober.

DETAILED DESCRIPTION OF THE REFERRED EMBODIMENTS

The sensor head of the present invention can be utilized as a single sensor. The sensor head can be utilized as a temperature prober by combining with an XYZ stage. Both cases will be explained.

As a single sensor, the sensor head (FIG. 3 or FIG. 4) is fitted by an adhesive tape on an object for non-destructive heat analysis or non-destructive examination of, e.g., LSIs mounted upon a ceramic package. The sensor head cannot be moved, because it is fixed by the adhesive tape. The static sensor head can measure time-dependent change of the temperature of a definite spot. The sensor head can he removed from the object by peeling the tape after the examination. The object is not damaged. The sensor head can be used again and again.

The present invention can obtain temperature distribution by measuring a plurality of spots on an object by a plurality of sensor heads or a single sensor head. A multispot observation is done by utilizing plural sensor heads simultaneously. The multispot observation is also carried out by moving a single sensor head sequentially. Temporary mounting by an adhesive tape enables the sensor head to change the spot for measurement facilely.

If the object permits destructive examination, the sensor head can be fixed by thermally hardening resin to the object. In this case, the resin permanently fixes the head on the object. In many cases, the most requisite measurement is the permanent spot observation. This invention is also convenient for the permanent spot observation.

Figure 11:
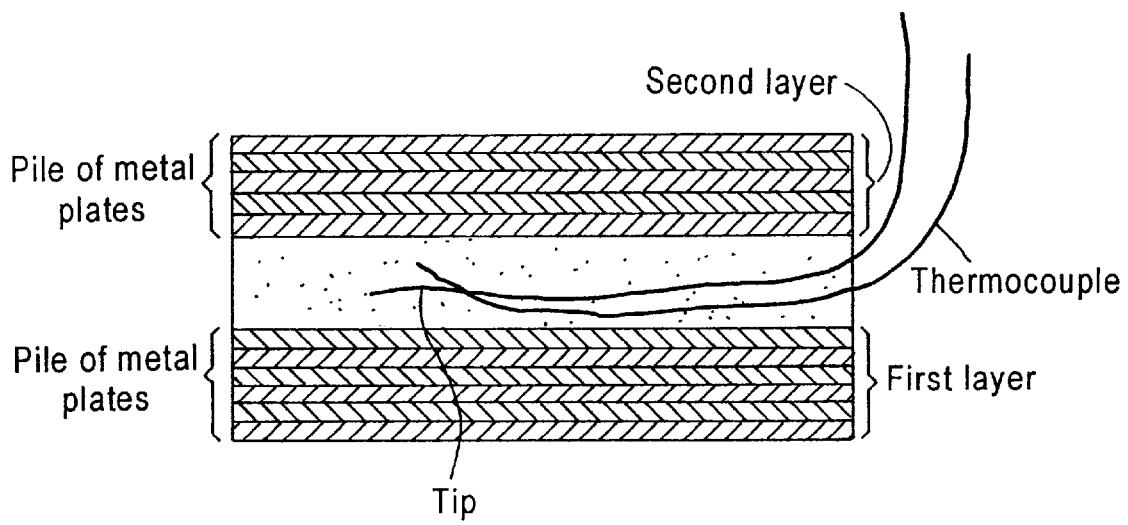
FIG. 11 is a vertically-sectioned front view of a surface temperature sensing head in accordance with an embodiment of the present invention.
Figure 12:
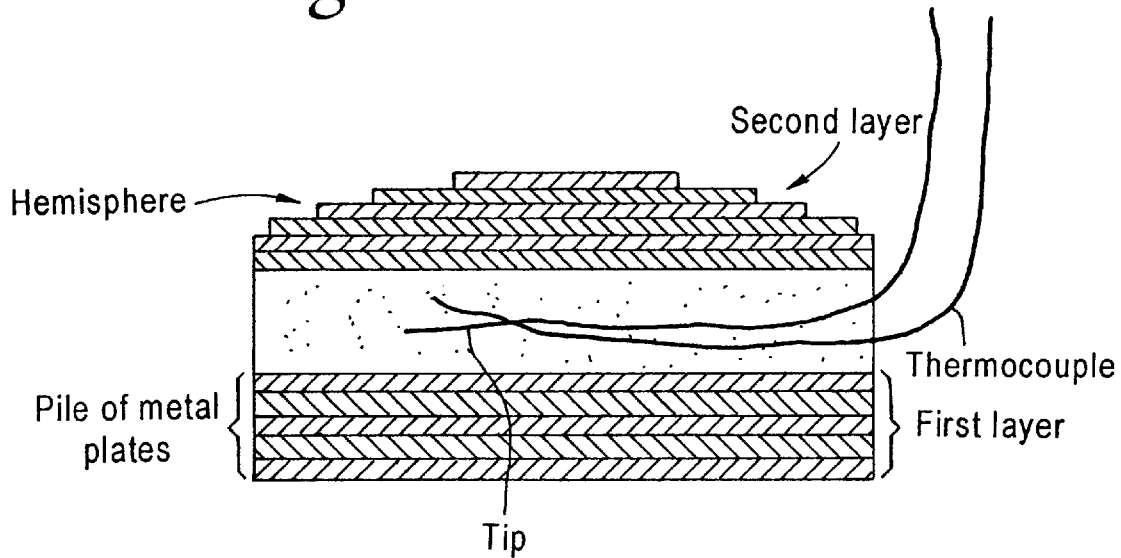
FIG. 12 is a vertically-sectioned front view of a surface temperature sensing head in accordance with an embodiment of the present invention.

The metal discs for holding the thermocouple can be finished into a diameter of less than 0.8 mm. Otherwise,the first and third plates can be made by piling a plurality of thin metal plates (see FIG. 11). Piling of plates improves the heat conduction of the head. An accumulation of metal plates allows the sensor head to become a quasi-hemisphere which is a convenient shape for touching the object (see FIG. 12). Furthermore, a hemispherical insulator can be fitted to the metallic sensor head. A temperature probe can be built by making the thermocouple pierce a narrow tube, coupling the insulator to the head and combining the sensor head via the insulator to a narrow tube.

Figure 1:
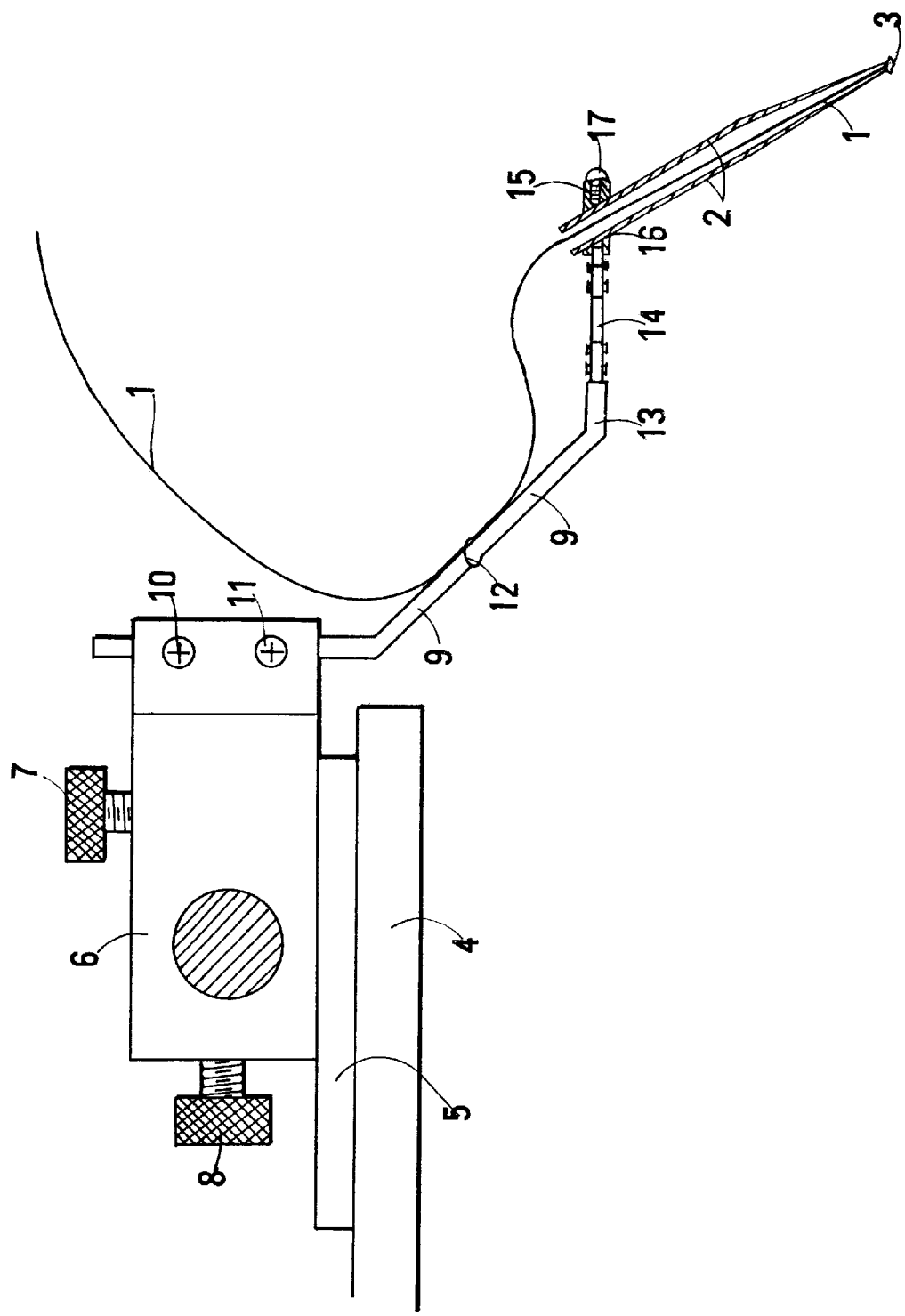
FIG. 1 is a schematic front view of a temperature prober having a surface temperature sensing head of the present invention.
Figure 2:
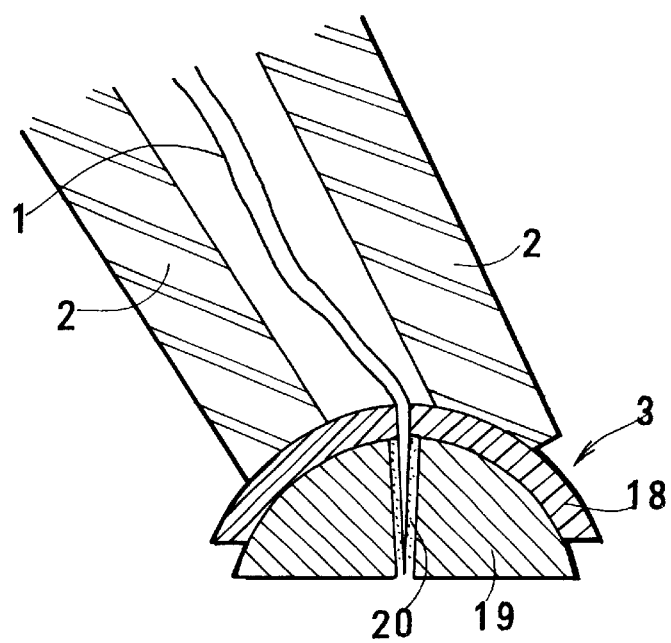
FIG. 2 is a vertically-sectioned view of a surface temperature sensor head proposed by a prior-filed Japanese Patent Application No.11-125566 of the Inventors.
Figure 3:
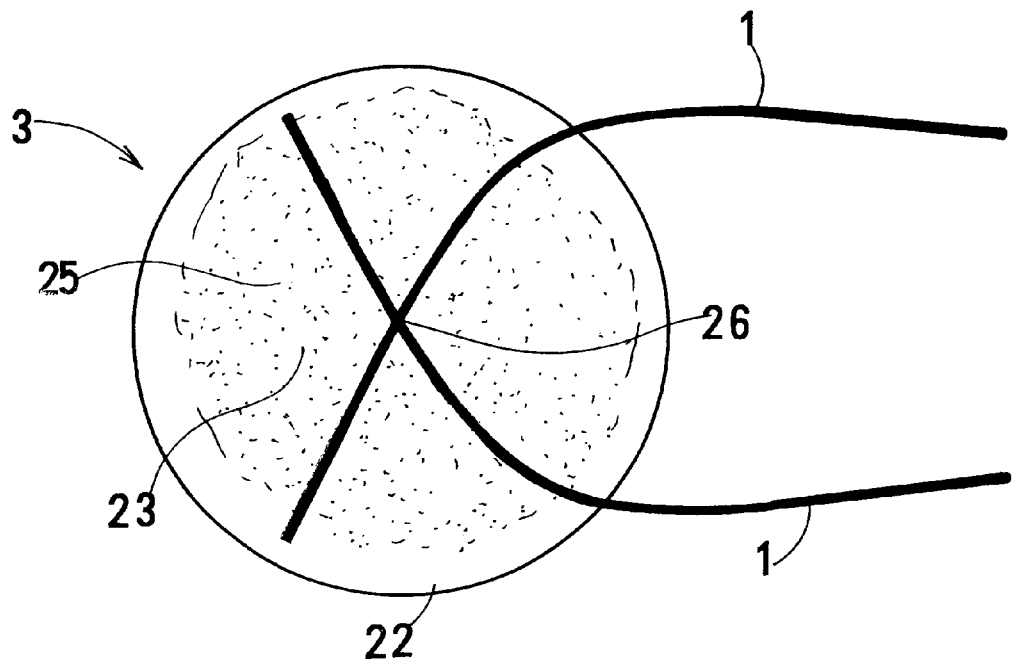
FIG. 3 is a horizontally-sectioned plan view of a surface temperature sensing head of a first embodiment of the present invention having two separated discs.
Figure 4:
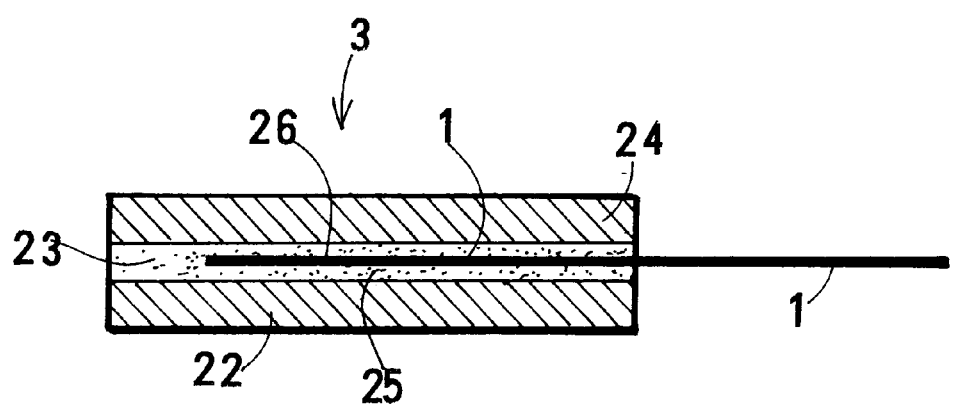
FIG. 4 is a vertically-sectioned front view of the surface temperature sensing head of the first embodiment of the present invention.

FIG. 1 shows the whole of a temperature measuring probe having the sensor head of the present invention. An XYZ-stage 6 enables the temperature measuring probe to displace the surface temperature sensor head 3 in three dimensional directions. A probe base 4 can move up and down. The probe base 4 sustains a magnet base 5, allowing a horizontal displacement of the magnet base 5. The XYZ-stage 6 is mounted upon the magnet base 5. The XYZ-stage 6 can be driven in the x-, y- and z-directions. Adjustment screws 7 and 8 are equipped with the XYZ-stage 6 for determining a temporary position of the XYZ-stage 6. A top end of an outward bent slender arm 9 is fixed to an end of the XYZ-stage 6 by screws 10 and 11. Another end 13 of the arm 9 is bent in the horizontal direction. A joint 15 is supported at the bottom end of the arm 9 via a spring 14. The joint 15 has an outer slanting hole 16. A tube 2 is inserted into the slanting hole 16 of the joint 15. The tube 2 is fixed by a screw 17 to the joint 15. A thermocouple 1 penetrates the tube 2. The tip of the thermocouple 1 has a three-storied contacter 3 (FIG. 3 and FIG. 4).

Figure 10:
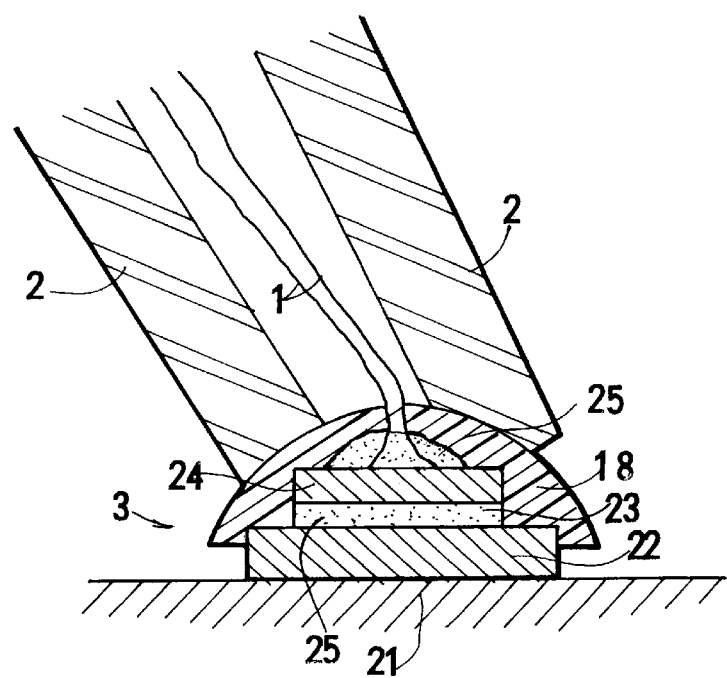
FIG. 10 is a vertically-sectioned view of a temperature sensing prober making use of the surface temperature head of the present invention.

FIG. 10 shows the detail of the head part. The three-storied head 3 is embedded into a hemispherical insulator 18. The bottom of the tube 2 presses down the hemispherical insulator 18. In the three-storied head 3, the first layer 22 is allowed to be equal to or bigger than the third layer 24 in size. In FIG. 10, only the brazing material 25 appears in the second layer 23. But the second layer 23 includes the crossing spot 26 of the thermocouple 1 in the braze 25. The first layer metal 22 is brought into contact with the surface of an object 21. The contact realizes stable thermal equilibrium between the head 3 and the object 21 which enables the thermocouple 1 to measure the exact temperature of the object 21.

The tail of the thermocouple 1 is left nearly free as shown in FIG. 1. The freedom permits the probe to move in three dimensional directions, that is, front and back, right and left or up and down. The thermocouple 1 is fixed to the arm 9 with a wire 12. The horizontal spring 14 is deformed elastically for buffering a shock which is induced by a contact of the contacter 3 to an object. The tube 2 presses down the head 3 to the object for bringing the head and object into equilibrium soon. Since the probe can be freely moved, temperature of an arbitrary spot can be measured by the probe. One probe can obtain temperature distribution by measuring temperatures at a lot of points on the object quickly.

The two metal plates 22 and 24 with a high heat conductivity enable the probe to measure the exact temperature of the object by lowering the contact heat resistance.

The probe head requires the plates to have a heat conductivity higher than 100 W/mK. Then, the present invention employs the plates having a heat conductivity higher than 100 W/mK. Thermocouples, in general, have a poor heat conductivity less than 20 W/mK. The head plates contribute to measuring the exact temperature by the higher heat conduction than the thermocouple.

The material of the plates can be shaped into an arbitrary form, for example, a small disc of a diameter less than 0.8 mm. The sandwich structure of the sensor head can be easily made by brazing the thermocouple with the plates. The tube is tapered off at the bottom. The tapered end is shaped into a concave-hemisphere. The hemisphere of the tube sustains the surface temperature head via the insulator. The thermocouple is pulled upward in a definite tension from the farther end. The head is pushed to the tube by the tension. Without adhesive, the tube can support the sensor head. The couple of the concave-hemisphere end and the hemispherical insulator permit the head to turn by acting as a bearing.

The insulator 18 eliminates the instability which would be induced by the heat leakage by shielding the head 3 from the heat exchange with the tube 2. The insulator 18 is for example, made of TEFLON resins. TEFLON is a polytetrafluoroethylene $(CF_2CF_2)^m$-. Since the surface temperature sensor head 3 is not stuck to the tube 2 with an adhesive, the sensor head 3, has a freedom of turning or swaying. The freedom allows the sensor head 3 to come in tight plane-to-plane contact with the surface of the object. A temperature prober can be built by fitting a plurality of sensor heads to an arm with a help of joins and mounting the arm to the XYZ-stage. The prober can touch a plurality of arbitrary spots by the heads and measure the temperatures at the spots simultaneously.

The units of heat conductivity and thermal resistance are explained. The unit of heat conductivity has been cal/seccm°C. This means the heat (cal) flowing in a second from a top unit surface (1 cm$^2$) to a bottom unit surface (1 cm$^2$) of a unit cube (1 cm$^3$) when a temperature difference of 1° C. is given to the surfaces. The area has a unit of cm$^2$. The length has a unit of cm. The denominator includes "cm". "cal" is no more an international unit. The conventional unit should be reduced to an international unit. 1 cal=4.2 J(joule). 1 J/sec=1 W. 1 cm=0.01 m. A degree of K (Kelvin) is equal to a degree of ° C. (celsius). Thus, 1 cal/seccm°C.=4.2 W/cmK=420 W/mK. The unit means the heat in joule flowing in a second from a top unit surface (1 m$^2$) to a bottom unit surface (1 m$^2$) of a unit cube (1 m$^3$) when a 1 K temperature difference is give to the surfaces. W/mK is the international unit of heat conductivity. "m" is not "milli" but "meter".

Another problem is the unit of heat resistance. Heat resistance is a ratio of the temperature difference to the heat flow. Heat conductivity is a parameter inherent to a material but independent of the size and shape. Thermal resistance is a parameter which depends upon both the material and the size and shape. Heat conductivity is denoted by σ. A sample is a block having a length L and a section A. The heat flowing from a top surface to a bottom surface per second is σA/L when a 1 K temperature difference exists between the surfaces. Thus, heat resistance which is the temperature difference inducing a unit heat flow (1 W) is L/σA. The unit of heat resistance is K/W. 1 K/W signifies that a 1 K temperature difference between both ends of an object causes a 1 W (1 J/sec) heat flow. A 1 W heat flow is extremely large for a 1 K temperature difference between the ends. No existing material of an ordinary shape and size has such a low heat resistance. Ordinary metals require a temperature difference of 10$^3$ to 10$^6$ K for producing a 1 W heat flow. For example, heat resistance of 1×10$^3$ K/W can be simplified to kK/W, where k means "kilo"=1000 and "kK" is called "kilokelvin". 1 kK/W=1000 K/W signifies that the medium needs 1000 degrees (K) of a temperature difference for carrying a heat flow of 1 W (1 J/sec) from an end to anther end.

A thermocouple should be made, from thin wires of materials having a small heat conductivity for prohibiting heat from flowing out of the sample via the wires. The least wire diameter of the thermocouple available at present is 12 $\mu$m. Too thin wires of a thermocouple are fragile and difficult for handling. Here, thermocouples having wires of a 50 $\mu$m diameter are employed.

There are a variety of pairs of wires for composing thermocouples which should be selected according to the ranges of objective temperatures, the atmospheres, the cost and the required accuracy. The most prevalent thermocouple is a chromel-almel thermocouple and copper-constantan thermocouple. Now, the heat resistance of the thermocouples are calculated. The sample thermocouples consist of two wires of a 5 mm length and a 0.05 mm diameter. The chromel-almel thermocouple has a heat resistance of about 22 kK/W (=22×10$^3$ K/W). The copper-constantan thermocouple has a heat resistance of about 4 kK/W (=4×10$^3$ K/W).

Golden wires which are used for wiring patterns of ICs mounted on ceramic packages are, for example, wires having a 1 mm length and a 20 $\mu$m diameter. The heat resistance of two gold wires of a 1 mm length and a 20 $\mu$m diameter is about 8 kK/W. In practice, the heat resistance of golden wires is high enough in packaged LSIs. The high heat resistance allows us to ignore the conduction loss via the golden wires in general.

Then, the chromel-almel thermocouple of a diameter less than 50 $\mu$m is chosen, because it has a heat resistance higher than 8 kK/W of the 1 mm long, 20 $\mu$m thick golden wires. The influence of the thermocouple should be smaller than the golden wires for wiring.

The element wires of the thermocouple is covered with a sheath. The material of the sheath should be a material of low heat conductivity for prohibiting heat from escaping out of the sample and invading into the sample from the surroundings. Here, a TEFLON sheath is selected for covering the elements of the thermocouple by taking account of the resistance against heat. The heat conductivity of the TEFLON is less than about 2 W/mK.

The materials having a high heat conductivity of more than 100 W/mK are, for example, copper, aluminum or so. Here, aluminum is employed as the material of the plates. The sensor head is made by placing crossing wires of a thermocouple on a plate and putting another plate on the wires, sandwiching the crossing wires by the plates and injecting a brazing material into the gap of two plates for fixing the wires and plates together. The head of the present invention has a structure in which a plate overlaps over another plate, and the crossing wires and brazing material are laid between the two plates. There are a variety of pairs of brazing materials and thermocouples.

[Embodiment 1 (Two Independent Discs; FIG. 3, FIG. 4)]

FIGS. 3 and 4 demonstrate Embodiment 1 coupling two independent discs for holding crossing tips of a thermocouple and a brazing material. The plates are independent, equivalent discs of copper. The three storied sensor head is also a disc. The diameter is, for example, about 0.8 mm. This embodiment is utilized for an asymmetric head having different discs as shown in FIG. 10. Since two independent round discs are employed, the embodiment has an advantage of the rotational symmetry. The bottom disc contacter ensures tight contact of the sensor to an object. The copper disc enhances the heat conduction for maintaining thermal equilibrium with the object.

Figure 5:
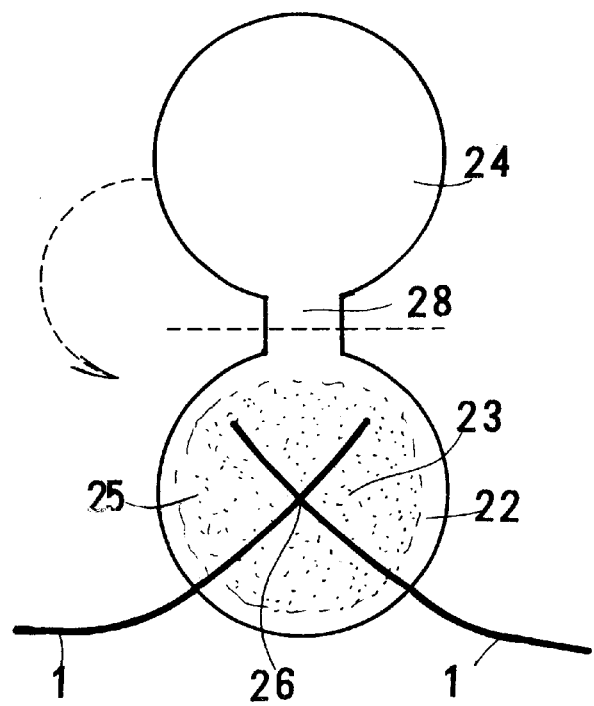
FIG. 5 is a plan view of another surface temperature sensor head produced by folding a copper plate having two disc parts in a preliminary state just before being folded as a second embodiment of the present invention.
Figure 6:
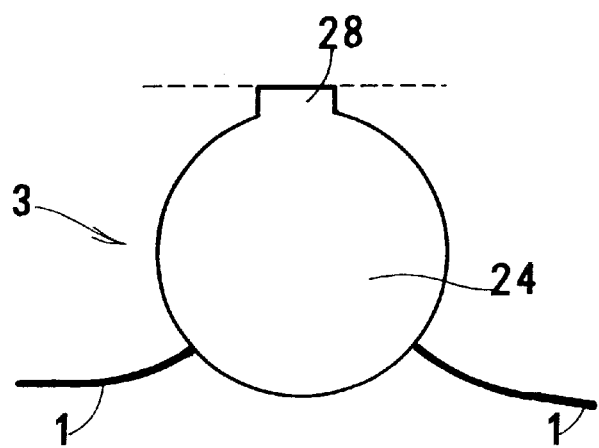
FIG. 6 is a plan view of the temperature sensor head of the second embodiment of the present invention.

[Embodiment 2 (A Unified Plate Having Symmetric Discs; FIG. 5, FIG. 6)]

A starting metal plate can be a unified plate having two disc parts. FIG. 5 and FIG. 6 denote Embodiment 2. A disc part 22 is coupled to another disc part 24 via a joint portion 28. A sensor head 3 is produced by putting crossing tips 26 of wires of a thermocouple 1 and a brazing material 25 on the disc part 22, bending the joint portion 28 for overlapping the disc 24 on the crossing tips 26 and sticking the plates together. The sensor head 3 is also made by putting the crossing tips 26 of wires of the thermocouple on the disc part 22, bending the joint portion 28 for overlapping the disc part 24 on the crossing tips 26, injecting the brazing material 25 into a gap between the disc parts for unifying the two disc parts. The production process of Embodiment 2 is easier than Embodiment 1. The joint portion 28 can either be left untouched or be eliminated by polishing.

Figure 7:
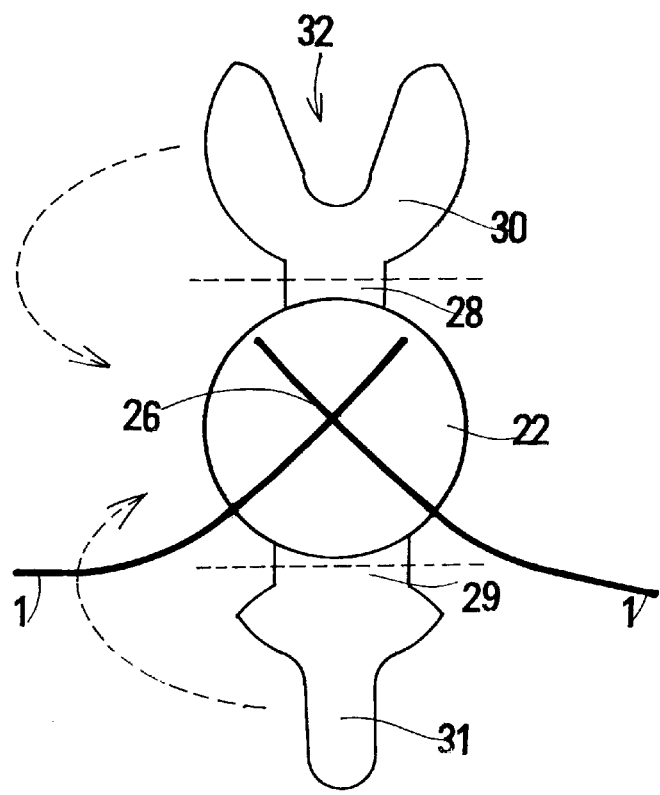
FIG. 7 is a plan view of another surface temperature sensor head produced by folding a copper plate having a disc part, a notched part and a projection part in a preliminary state just before being folded as a third embodiment of the present invention.
Figure 8:
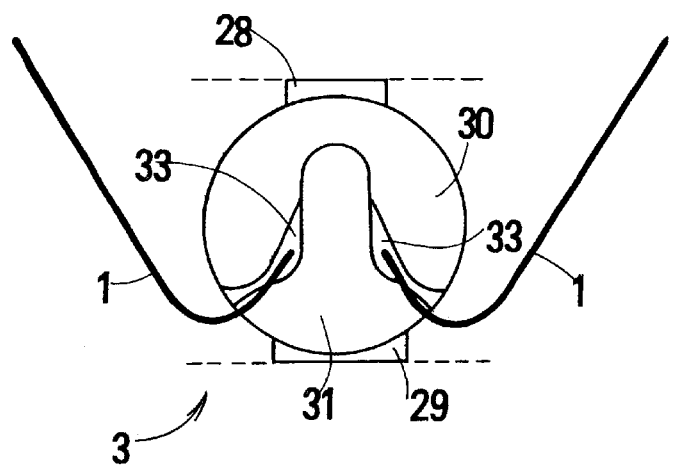
FIG. 8 is a plan view of the temperature sensor head of the third embodiment of the present invention.

[Embodiment 3 (A Unified Plate Having Asymmetric Discs; FIG. 7, FIG. 8)]

Another starting plate has asymmetric discs as shown in FIG. 7 and FIG. 8. The plate is a copper plate having a central disc 22, joints 28 and 29, convex disc part 31 and concave disc part 30 which are connected to the central disc 22 via the joints 28 and 29. The joints 28 and 29 are half-thinned by etching. The concave disc part 30 has an aperture 32. A head 3 is assembled by positioning a crossing part 26 of a thermocouple 1, bending the joint 28, pressing the crossing part 26 by the concave disc part 30, bending the joint 29, pressing the crossing part 26 by the convex disc part 31, pulling out the wires of the thermocouple 1 from apertures 33 between two disc parts (FIG. 8), injecting a brazing material 25 into a thin space between the central disc part and the concave and convex disc parts for fixing the three disc parts together with the tips 26. Otherwise, supplying the brazing material to the disc 22 precedes the step of bending of the disc parts 30 and 31. This order of assembly enjoys the best processability. The tiny head enables the surface temperature prober to examine exact temperatures of narrow regions of a 0.3 mm diameter.

Figure 9:
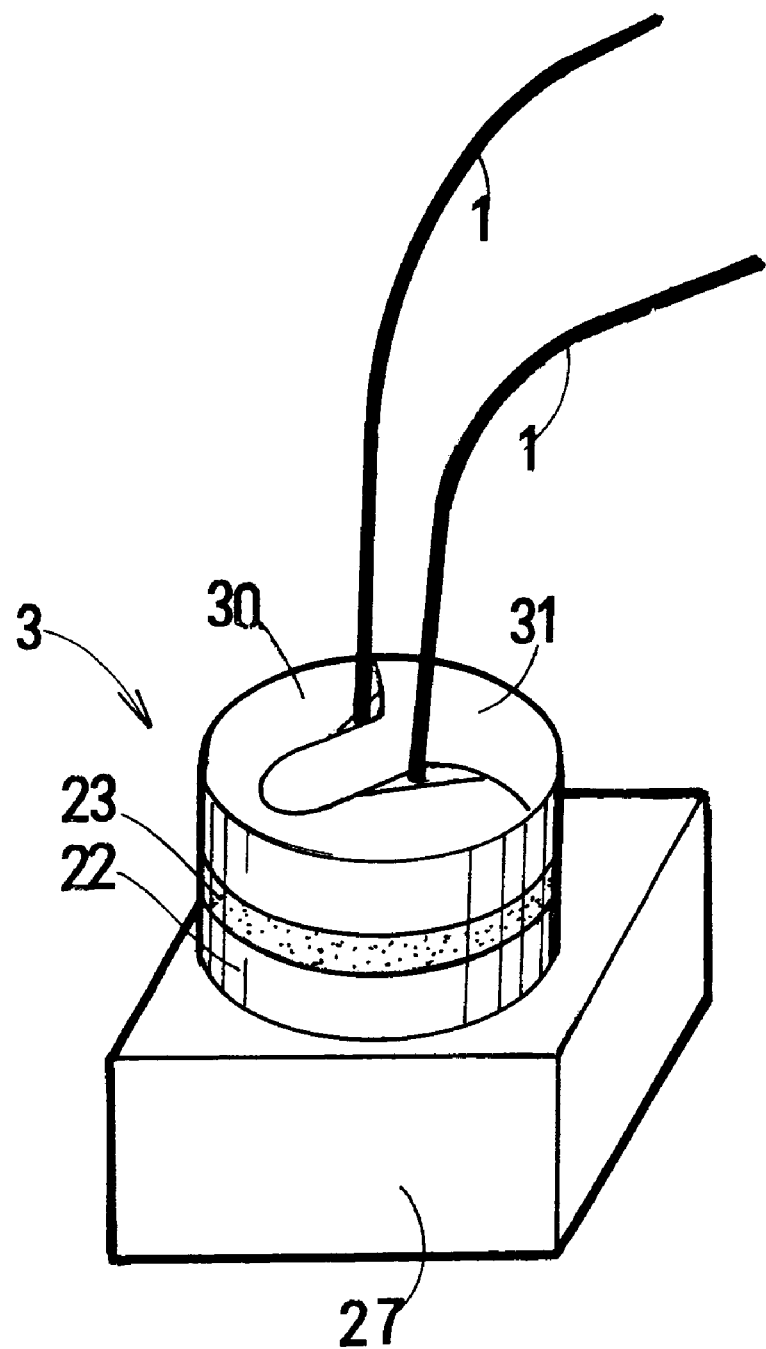
FIG. 9 is a perspective view of a surface temperature sensor head having a copper disc part and an insulating aluminum nitride chip fitted on the bottom of the copper disc part as a fourth embodiment of the present invention.

[Embodiment 4 (On AlN Chip; FIG. 9)]

A thermocouple makes use of the change of thermoelectric power for measurement. If an object is a metal biased by a voltage, the thermocouple cannot measure the exact temperature of the object. For avoiding the influence of the bias voltage, the thermocouple should be electrically separated from the object. In the case, the sensing head is separated from the object by attaching an insulating material to the head. The insulating material should have high electric conductivity and high heat conductivity. For the isolation, an insulating AMN (aluminum nitride) chip 27 is joined to the bottom of the metal plate 22 of the sensor head 3. The AlN chip 27 has an uncovered AlN bottom surface and an Au-coated top surface. The bottom of the sensor head 3 should be brazed upon the Au-coated top of the AN chip 27. The head 3 is electrically separated from the object by the AlN chip 27.

In FIG. 9, the AlN chip 27 has, for example, a 0.3 mm length, a 0.3 mm width and a 0.1 mm thickness. Instead of AlN, diamond or AlN/diamond complex can be utilized for making the insulating chip. The use of diamond would raise the cost. But the diamond insulating chip shortens the response time of measuring temperature owing to higher heat conductivity than AlN. Besides, the accuracy of the measurement is also enhanced.

A temperature prober as shown in FIG. 1 is assembled by making use of the AlN-insulated sensor head 3 of FIG. 9. The tube 2 has a 50 mm length, a 5 mm outer diameter and a 3 mm inner diameter. The tapered tip of the tube 2 has an inner diameter of 0.5 mm and an outer diameter of 1.2 mm. The tip has an inclination angle of 30 degrees. The insulating layer 18 (FIG. 10) is made from bubbled polyethylene (PE). The heat conductivity of the bubbled polyethylene is less than 0.04 W/mK. The sensor head 3 enables the temperature prober to measure small spots of a 0.3 mm square.

Five equivalent sensor heads are made in accordance with the teaching of the present invention for comparing the data. Temperatures of the same spot of a common object are measured by the five sensor heads. The standard deviation σ is 0.03° C. The 3 σ-accuracy of measuring temperature of the prober turns out to be 0.1° C. by multiplying 0.03° C. by 3.

There are several applications for the sensor head of the present invention. The sensor head is installed on a probe card for examining ICs or LSIs. The probe card having the sensor heads is advantageous for testing electric properties of LSIs, because the temperature or temperature distribution of LSIs is continually observed with high precision and high spatial resolution. A heat microprober is built by mounting the sensor head on an arm of an XYZ-stage by acrylic screws. Since the heat microprober is similar to an electric microprober, it can measure temperatures of several points, maintaining spatial high resolution. If prior thermocouple heads are used to measure the temperature of an object suffering from an electric bias, the electric bias causes malfunction of the sensor by reducing the thermoelectric power, causing noise or inducing abnormal voltages. But the present invention employs an insulating contacter, for example, an aluminum nitride (AlN) chip as a foot of the sensor head for separating electric bias from the sensor head. The use of the insulating contacter enables the sensor to measure electric properties and temperature distribution of an object simultaneously with high precision.

I claim:

1. A surface temperature sensor head comprising:
    a first layer being a disc of 0.8 mm or less than 0.8 mm in diameter or a square of 0.8 mm or less than 0.8 mm in side and being made of a material of a heat conductivity higher than 100 W/mK;
    a second layer having crossing tips of a thermocouple and a brazing material; and
    a third layer being a disc of 0.8 mm or less than 0.8 mm diameter or a square of 0.8 mm or less than 0.8 mm in side and being made of a material of a heat conductivity higher than 100 W/mK;
    the brazing material unifying the crossing tips, the first layer and the third layer, wherein the crossing tips are positioned in the surface temperature sensor head without extending through either the first layer or the third layer.

2. The surface temperature sensor head according to claim 1, wherein one or both of the first layer and the third layer are made of a metal chosen from a group of copper, copper alloys, molybdenum, magnesium, silver, aluminum, aluminum alloys and gold.

3. The surface temperature sensor head according to claim 1, wherein the first layer and the third layer are independent discs of a first disc and a second disc, and the head is made by putting the crossing tips and the brazing material on the first disc, putting the second disc on the crossing tips and the brazing material, sandwiching the brazing material and the crossing tips between the first and second discs and sticking the second disc and the crossing tips to the first disc by the brazing material.

4. The surface temperature sensor head according to claim 1, wherein the first layer and the third layer are coupled together to be a unified metal thin plate including a first disc part, a second disc part and a joint, and the head is made by putting the crossing tips and the brazing material on the first disc part, overlapping the second disc part over the first disc part, sandwiching the brazing material and the crossing tips between the first and second disc parts and sticking the second disc part and the crossing tips to the first disc part by the brazing material.

5. The surface temperature sensor head according to claim 1, wherein the first layer and the third layer are coupled together to be a unified metal thin plate including a first disc part, a second disc part and a joint, and the head is made by putting the crossing tips on the first disc part, overlapping the second disc part over the first disc part, sandwiching the crossing tips between the first and second disc parts, injecting the brazing material into a gap between the first and second disc parts and sticking the second disc part and the crossing tips to the first disc part by the brazing material.

6. The surface temperature sensor head according to claim 1, wherein the first layer and the third layer are coupled together to be a unified metal thin plate including a central disc part, a convex disc part and a concave disc part with an aperture, a first joint connecting the convex disc part to the central disc part and a second joint connecting the concave disc part to the central disc part, and the head is made by putting the crossing tips and the brazing material on the central disc part, overlapping the concave disc part over the central disc part, overlapping the convex disc part over the central disc part, sandwiching the brazing material and the crossing tips between the central disc part and the convex and concave disc parts and sticking the convex and concave disc parts and the crossing tips to the central disc part by the brazing material.

7. The surface temperature sensor head according to 6, wherein the first joint and the second joint are thinned by half-etching for bending the convex and concave disc parts easily at the joints.

8. The surface temperature sensor head according to claim 1, wherein the first layer and the third layer are coupled together to be a unified metal thin plate including a central disc part, a convex disc part, a concave disc part with an aperture, a first joint connecting the convex disc part to the central disc part and a second joint connecting the concave disc part to the central disc part, and the head is made by putting the crossing tips on the central disc part, overlapping the concave disc part over the central disc part, overlapping the convex disc part over the central disc part, sandwiching the crossing tips between the central disc part and the convex and concave disc parts, injecting the brazing material into a gap between the central disc part and the convex and concave disc parts, and sticking the convex and concave disc parts and the crossing tips to the central disc part by the brazing material.

9. The surface temperature sensor head according to claim 8, wherein the first joint and the second joint are thinned by half-etching for bending the convex and concave disc parts easily at the joints.

10. The surface temperature sensor head according to claim 1, wherein the first layer and the third layer is a disc having a diameter of 0.8 mm or less than 0.8 mm.

11. The surface temperature sensor head according to claim 1, wherein the first layer and the third layer is a square having a side of 0.8 mm or less than 0.8 mm.

12. The surface temperature sensor head according to claim 1, wherein the first layer and the third layer is a disc having a diameter of 0.3 mm or less than 0.3 mm.

13. The surface temperature sensor head according to claim 1, wherein the first layer and the third layer is a square having a side of 0.3 mm or less than 0.3 mm.

14. The surface temperature sensor head according to claim 1, wherein the first layer and the third layer are independent discs of a first disc and a second disc, the first disc is a pile of a plurality of thin metal discs, the second disc is a pile of a plurality of thin metal discs and the head is made by putting the crossing tips and the brazing material on the first disc, putting the second disc on the crossing tips and the brazing material, sandwiching the brazing material and the crossing tips between the first and second discs and sticking the second disc and the crossing tips to the first disc by the brazing material.

15. The surface temperature sensor head according to claim 14, wherein the second disc including a pile of the metal discs is shaped into a hemisphere.

16. The surface temperature sensor head according to claim 1, wherein an insulator is fitted to the first layer for insulating electrically the head from the object.

17. The surface temperature sensor head according to claim 16, wherein the insulator is a plate of AlN or a plate of an AlN compound.

18. The surface temperature sensor head according to claim 17, wherein the AlN or AlN compound plate has a 0.3 mm width, a 0.3 mm length and a 0.1 mm thickness.

19. The surface temperature sensor head according to claim 16, wherein the insulator is a plate of diamond or a plate of diamond/AlN complex.

20. The surface temperature sensor head according to 19, wherein the diamond or diamond/AlN complex plate has a 0.3 mm width, a 0.3 mm length and a 0.1 mm thickness.

* * * * *

UNITED STATES PATENT AND TRADEMARK OFFICE
CERTIFICATE OF CORRECTION

PATENT NO.    : 6,464,393 B2
DATED         : October 15, 2002
INVENTOR(S)   : Tatoh It is certified that error appears in the above-identified patent and that said Letters Patent is hereby corrected as shown below:

Title page,
Item [*] Notice, delete "23 days" and insert -- 0 days --.

Signed and Sealed this

Tenth Day of January, 2006

JON W. DUDAS
*Director of the United States Patent and Trademark Office*